(12) United States Patent
Stucker et al.

(10) Patent No.: US 8,451,997 B2
(45) Date of Patent: May 28, 2013

(54) SAFE CONVERSATION PARK AND RETRIEVAL

(75) Inventors: Brian S. Stucker, Redmond, WA (US); Lokesh Srinivas Koppolu, Redmond, WA (US); Stephen H. Houchen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 363 days.

(21) Appl. No.: 12/794,460

(22) Filed: Jun. 4, 2010

(65) Prior Publication Data
US 2011/0299675 A1 Dec. 8, 2011

(51) Int. Cl.
*H04M 3/42* (2006.01)

(52) U.S. Cl.
USPC ............ 379/207.02; 379/207.11; 379/210.01; 379/211.01

(58) Field of Classification Search
USPC ............ 379/207.02, 212.01, 202.01, 207.11, 379/201.01, 210.01, 211.01; 709/203
See application file for complete search history.

(56) References Cited

U.S. PATENT DOCUMENTS

| | | | |
|---|---|---|---|
| 6,526,274 B1 | 2/2003 | Fickes et al. | |
| 7,616,749 B2 | 11/2009 | Poustchi | |
| 7,653,191 B1 | 1/2010 | Glasser et al. | |
| 2009/0036128 A1 | 2/2009 | Raguparan et al. | |
| 2009/0086950 A1* | 4/2009 | Vendrow et al. | 379/202.01 |
| 2009/0097633 A1 | 4/2009 | James et al. | |
| 2010/0290611 A1* | 11/2010 | Ramanathan et al. | 379/212.01 |
| 2011/0179107 A1* | 7/2011 | Srinivasan et al. | 709/203 |

OTHER PUBLICATIONS

Procter, M., "An Approach to Call Park/Retrieve using SIP", Retrieved at << http://64.170.98.42/pdf/draft-procter-bliss-call-park-extension-00.pdf >>, Feb. 26, 2007, pp. 12.

Mahy, et al., "A Call Control and Multi-Party Usage Framework for the Session Initiation Protocol (SIP)", Retrieved at << http://www.rfc-editor.org/internet-drafts/draft-ietf-sipping-cc-framework-12.txt >>, Dec. 20, 2009, pp. 62.

Procter, Michael., "Implementing Call Park and Retrieve using the Session Initiation Protocol(SIP)", Retrieved at << http://webcache.googleusercontent.com/search?q=cache:KC0iOJ_RlzsJ:bliss-ietf.org/meetings/ietf71/bliss-5.ppt+retrieving+parked+calls+%2B+orbit&cd=6&hl=en&ct=clnk >>, Mar. 11, 2008, pp. 8.

"Strata CIX and CTX IPT/DKT Telephone User Guide", Retrieved at << http://www.retrevo.com/d/df/Strata_CIXCTX_User_Guide_IPT2000_DKT3000.pdf?doc=dc0289ee2862a8b29c6f8b3f91b9133c&ts=1271045428779&rk=0.5677385559469345 >>, Version C.1, Aug. 2005, pp. 151.

* cited by examiner

*Primary Examiner* — Thjuan K Addy
(74) *Attorney, Agent, or Firm* — Turk IP Law, LLC

(57) ABSTRACT

Safe parking and retrieval of multimodal conversations is enabled through a park server generating a token and encoding it in an address identifier associated with a parking slot. A client application can display the address identifier with the token as a link in a text-based message or in conversation history items. The identifier encoded link may ensure that the intended call can be retrieved from a given parking slot without being confused with another parked call. If another call is parked at the same orbit, the encoded token does not match, and the park server may reject the retrieval attempt with an error message.

20 Claims, 8 Drawing Sheets

SAFE CONVERSATION PARK AND RETRIEVAL

BACKGROUND

Traditional telephone systems enable users to pause their conversations and continue at a later time frame. Commonly referred to as holding, this feature enables users to engage in alternate activities during a call. An advancement to simple call holding, call parking enables users to hold a conversation at one phone and continue the conversation in another.

Traditional call holding systems also employ call parking services to manage conversation transfers. Users can activate the call parking feature during a conversation by pressing a button or a special sequence of buttons reserved for call parking. The telephone conversation is then transferred to an unused extension number while holding the conversation. In such traditional call park services, potential of unintended call retrieval is prevalent. A misdialed extension may pick up another party's conversation on hold. Such errors may lead to interruptions and waste of time and effort in reestablishing progress made during conversations.

Some incomplete solutions to such issues utilize large pools of call park extensions that are assigned to individual user. However, large pools do not guarantee a parked call from being accidentally retrieved by a third-party. Lack of coordination among users inherent in legacy call park and retrieval systems permit conversation interruptions and may impede progress during communications.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Some embodiments are directed to enabling the parking of a multimodal conversation and generating a security code associated with the parked call's parking slot to be displayed by a client application to a user parking the call. The security code and the parking slot (also known as a call park orbit) may then be communicated to one or more users for retrieval. A party attempting to retrieve the call may be challenged for the security code. Failure to supply the security code may cause the retrieval attempt to be rejected with an error message.

Other embodiments are directed to retrieval of a parked multimodal conversation, where a park server may generate a token and encode the token in an address identifier associated with a parking slot, which a client application may display as a link in a text-based message or in conversation history items. The identifier encoded link may ensure that the intended call can be retrieved from a given parking slot without being confused with another parked call. If another call is parked at the same orbit and the encoded token does not match, the park server may reject the retrieval attempt with an error message. If the encoded token is not provided, the retrieval attempt may be handled as a call retrieval for a given call parked at the specified orbit.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
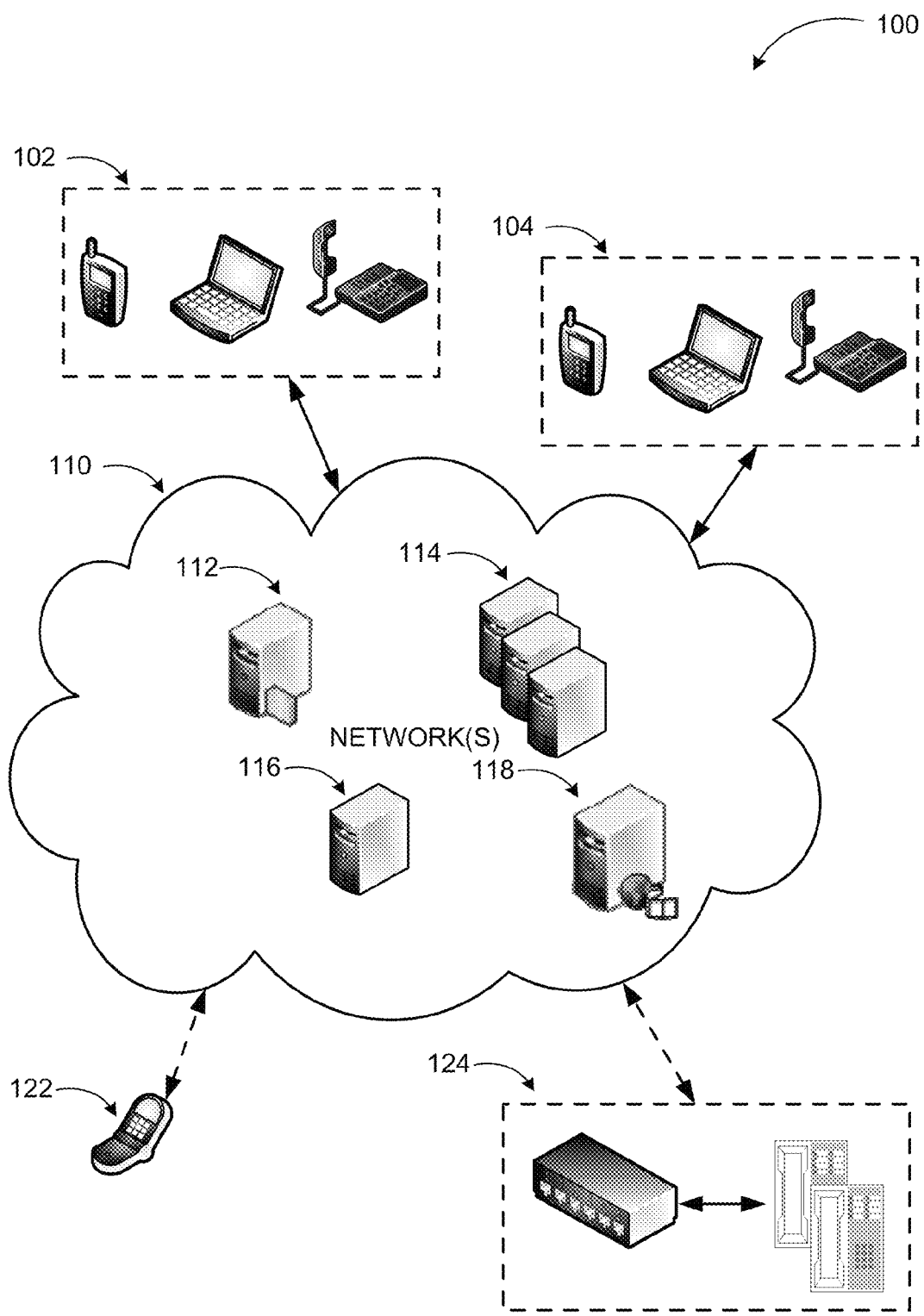
FIG. 1 is a diagram illustrating an example enhanced communication system, where embodiments may be implemented for safe parking and retrieval of multimodal conversations.

As briefly described above, individual or all modalities of multimodal conversations may be safely parked and retrieved in an enhanced communication system by encoding a token in an address identifier for a parking slot, which a client application may display as a link in a text-based message or in conversation history items for retrieval by a user. A security code may also be employed to safely retrieve a parked call. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "server" generally refers to a computing device executing one or more software programs typically in a networked environment. However, a server may also be implemented as a virtual server (software programs) executed on one or more computing devices viewed as a server on the network. Similarly, a "client" may refer to a computing device enabling access to a communication system or an application executed on a computing device enabling a user to access a networked system such as a social networking service, an email exchange service, and comparable ones. More detail on these technologies and example operations is provided below.

Referring to FIG. 1, diagram 100 of an example enhanced communication system, where embodiments may be implemented for safe parking and retrieval of a multimodal conversation, is illustrated. Enhanced communication systems such as a unified communication system to provide subscribers the ability to safely park and retrieve calls. While such systems may integrate various aspects of multi-modal communications such as a safe call parking and retrieval, subscribers may also participate in other systems such as social networking systems, other email systems, and similar ones. Thus, an enhanced communication system may provide a suitable platform for managing safe parking and retrieval of a multimodal conversation for a subscriber. A unified communication system is a real-time communications system facilitating instant messaging, presence, audio-video conferencing, web conferencing functionality, and comparable capabilities.

In a unified communication ("UC") system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network ("PSTN"). End devices may include any type of smart phone, cellular phone, any computing device executing a communication application, a smart automobile console, and advanced phone devices with additional functionality. Moreover, a subscriber of the UC system may use more than one end device and/or communication application for facilitating various modes of communication with other subscribers. End devices may also include various peripherals coupled to the end devices through wired or wireless means (e.g. USB connection, Bluetooth connection, etc.) to facilitate different aspects of the communication.

UC Network(s) 110 includes a number of servers performing different tasks. For example, UC servers 114 may provide registration, presence, and routing functionalities. Routing functionality enables the system to route calls to intended for a user to anyone of the client devices assigned to the user based on default and/or user set policies. For example, if the user is not available through a regular phone, the call may be forwarded to the user's cellular phone, and if that is not answering a number of voicemail options or forwarding of the incoming call to one or more designated people may be utilized. Since the end devices may be capable of handling additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, presence servers providing presence functionality, home servers providing routing functionality, rights management servers, and so on. Similarly, access server 112 may provide multiple functionalities such as firewall protection and connectivity, or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a commonly used method.

SIP is an application-layer control (signaling) protocol for creating, modifying, and terminating sessions with one or more participants. It can be used to create two-party, multi-party, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real-time Transport Protocol ("RTP").

A conversation as used herein refers to a multimodal communication session, where users may communicate over a plurality of devices, applications, and communication modes simultaneously or sequentially. For example, two users may initiate a conversation by exchanging instant messages through their desktop computers. Later, the communication may be elevated to audio and instant message with one user utilizing their desktop for both modes, while the other uses the desktop computer for instant messaging and a smart phone device for the audio mode. Other users may join or leave the conversation other modes and devices may be added or removed. The commonality between these communications may be preserved by designating all these communications as belonging to the same conversation. Conversations may be assigned a unique identifier, which enables users to view, record, modify, share, and generally manage aspects of the conversation including documents and other data associated with the conversation (e.g. documents exchanged as attachments in one mode of the conversation or recordings of other modes of the conversation).

For multimodal communication systems, which maintain extensive conversation histories that are not synchronized with a state of a parked call, the strategy of using large orbit pools may not work as the time frame involved may be much longer if a user is trying to retrieve a call from a conversation history item. Additionally, the orbit pools have be human-dialable, thus, increasing the orbit pool to the size of a user identifier may not be feasible.

While the example system in FIG. 1 has been described with specific components such as mediation server, A/V server, and similar devices, embodiments are not limited to this system of the example components and configurations. An enhanced communication system facilitating multimodal conversations with safe parking and retrieval capability may be implemented in other systems and configurations employing fewer or additional components. Furthermore, such systems do not have to be enhanced communication systems integrating various communication modes. Embodiments may also be implemented in systems facilitating different communication modes distinctly by coordinating implementation of the rules across different communication modes using the principles described herein.

Figure 2:
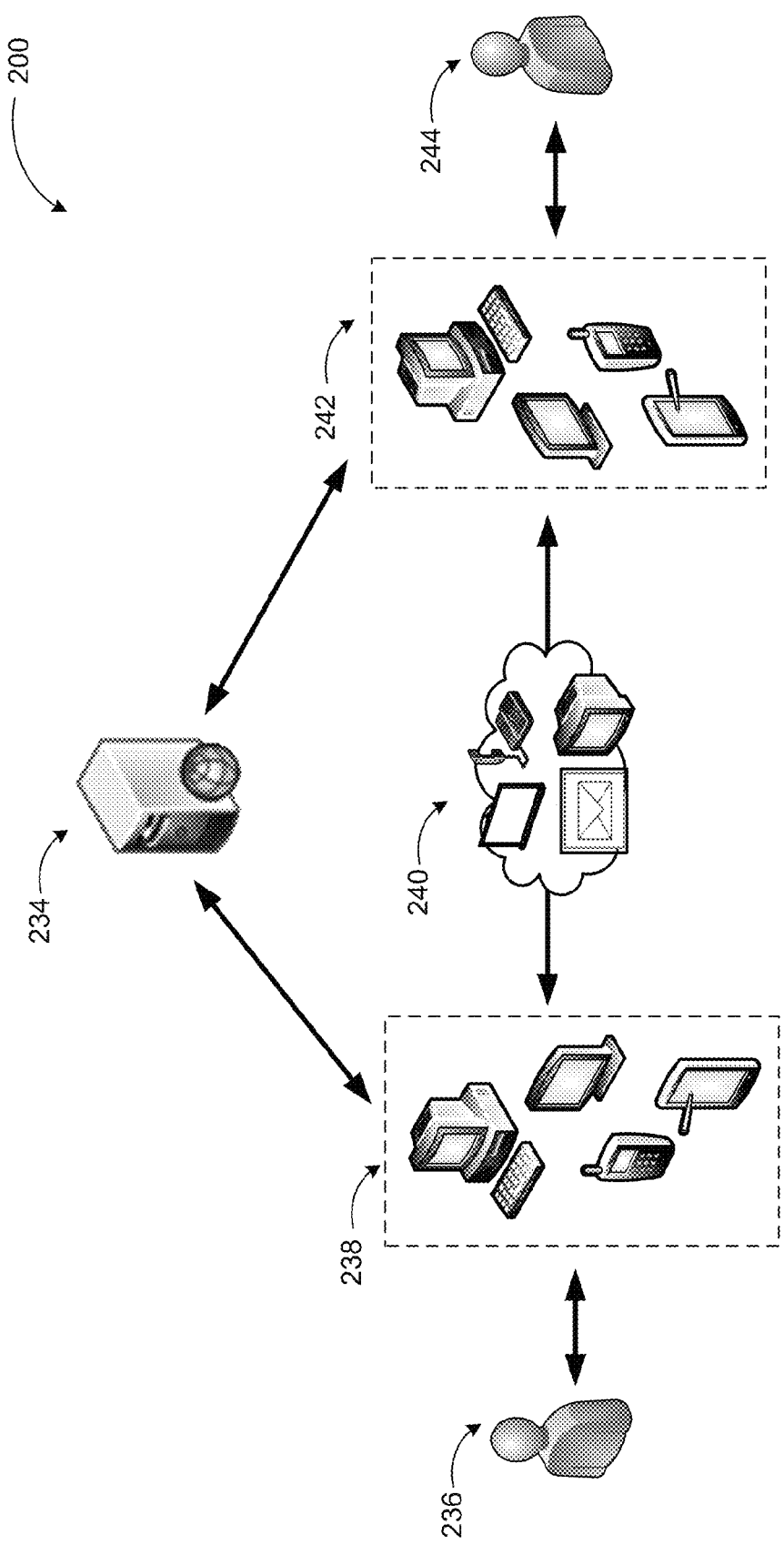
FIG. 2 is a conceptual diagram illustrating basic components of an example system for facilitating safe parking and retrieval of multimodal conversations.

FIG. 2 includes conceptual diagram 200 illustrating basic components of an example system for facilitating safe parking and retrieval of a multimodal conversation. While a system according to embodiments is likely to include a number of servers, client devices, and services such as those illustratively discussed in FIG. 1, only those relevant to embodiments are shown in FIG. 2.

In an enhanced communication system such as a unified communication system, users (e.g. 236, 244) may facilitate multimodal communications 240 employing one or more end devices (e.g. 238, 242) and associated peripherals. Multimodal communication 240 may include audio, video, file sharing, desktop sharing, instant messaging, electronic mail, whiteboard sharing, and similar forms of communication. The conversation may be established and managed by one or more servers in a distributed fashion (e.g. server 234).

In enhanced communication systems, different modalities of the same conversation may be parked together as a single multimodal parked conversation and retrieved together or separately. For example, a customer may call in to a sales department of a company using audio only. The responding sales person may elevate the conversation to audio and desktop sharing. At some point during the conversation, the sales person may realize he/she needs to bring in (or transfer to) a technical expert. The sales person may park the conversation and notify a technical expert about the parked conversation. The technical expert may then retrieve the conversation using both modalities or just one and continue serving the customer.

There are several aspects of parking and retrieving multimodal conversations as illustrated in the above described example. The modalities (audio and instant messaging) may be parked together at a dedicated server (park server), at distinct dedicated servers (one park server for each modality), at multipurpose server(s) (e.g. a routing server), or even at individual endpoints of the system. The sales person may notify the technical expert through various means such as an electronic mail, an instant message, a SIP notification, a notification application of the communication system, or even voice based notification (a voice mail or audio call for example). The notification may include elements such as links to individual parked modalities such that the technical expert can select and retrieve individual modalities or a link to the entire conversation. Moreover, the notification may be directed to identified person(s) or to a group (e.g. a group instant message to the entire technical assistance group such that any available technical expert can retrieve the parked conversation).

Participants in a multimodal conversation such as the one shown in diagram 200 may be part of the same network (e.g. an enterprise network), connected through different networks (e.g. in a federated environment), or communicate via a combination of secure and unsecure networks such as the Internet. Appropriate security measures such as personal identification numbers, passwords, and comparable ones may be employed to ensure privacy and security of the conversation.

According to some embodiments, a token may be generated by a park server (e.g. server 234) upon receiving a call parking indication from a client and the token returned to the client parking the multimodal conversation. An example token may be an escaped or encoded parked-call header. The token may uniquely identify the call that is parked at the server. The token may also identify the conversation using SIP dialog information such as the call-id, from or to tags, and orbit identifier. In addition, the token may be transmitted to multiple clients embedded in an address identifier (e.g. parking party's Uniform Resource Identifier "URI"). The token may be synthesized by the client into a hyperlink, which may be exposed in the conversation history and conversation park User Interface (UI).

The user originally parking the call may forward the synthesized link to another user or group for retrieval. If that user clicks on the hyperlink on their user interface (UI), this may cause their client to generate a new outbound conversation to the park server with the appropriate orbit and retrieval information. The park server may verify if the call indicated by the parked-call header is still parked at the given orbit. If the call requested by the client is still parked at the orbit, the park server may transfer the parked call to the client. Otherwise, the park server may return an error indicating no parked call in the orbit. Alternatively, the call park server may generate a PIN associated with the parked call's orbit, which may be communicated to one or more users along with the parking slot of the parked call. When a party attempts to retrieve the call, they may be challenged for the PIN. Failure to supply the correct PIN may cause the retrieval attempt to be rejected with an error message, as discussed previously.

Additionally, no new calls may be parked at an orbit if a specific call is already parked at that orbit. However, if faced with lack of resources, such as unavailability of additional extension numbers, the park server may choose to park a call with a different token in a previously occupied orbit. When an extension is occupied by multiple parked conversations, request by token may assure correct retrieval of the requested call.

Figure 3:
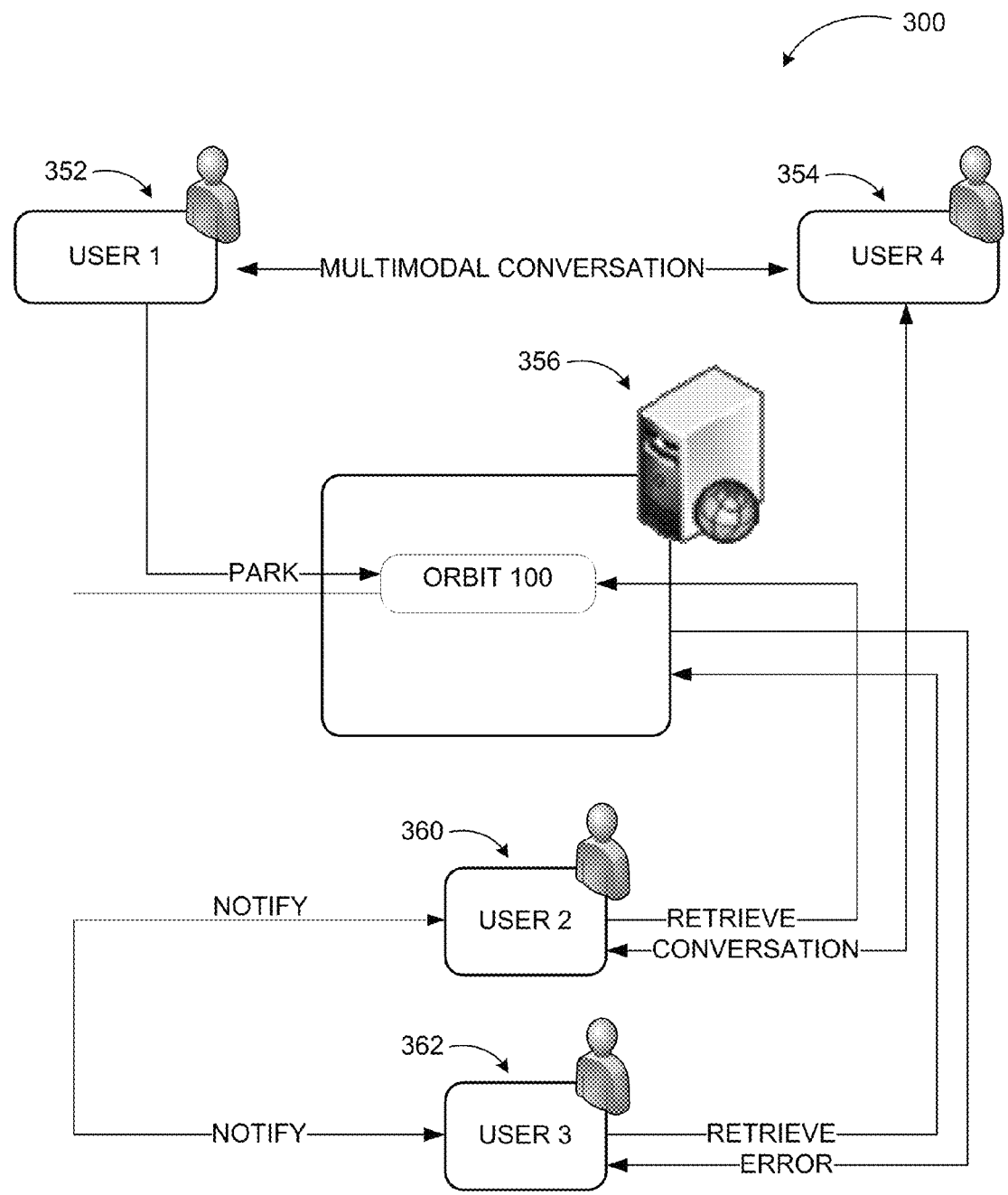
FIG. 3 is a conceptual diagram illustrating major components and actions in an enhanced communication system for facilitating safe parking and retrieval of multimodal conversations according to embodiments.

FIG. 3 illustrates major components and actions in an enhanced communication system for facilitating safe parking and retrieval of a multimodal conversation according to embodiments. A multimodal conversation between user 1 (352) and user 4 (354) may be taking place according to the example scenario shown in diagram 300. User 1 may park the multimodal conversation with user 4 in orbit 100 at park server 356. Orbit 100 may stand for extension 100 in a call parking system. Upon parking of the multimodal conversation, the park server 356 may notify user 2 (360) and user 3 (362) about the parked conversation. User 2 may request to retrieve the parked conversation from the park server 356. The park server 356 may establish the multimodal conversation parked in orbit 100 between user 2 and user 4. If user 3 subsequently requests to retrieve the multimodal conversation from the park server 356, the park server may return an error message to user 3 indicating unavailability of the multimodal conversation.

An example scenario may be when a customer engages in a voice conversation with a support technician. During the conversation, the support technician may initiate an audio conversation with the customer by simultaneously engaging in instant messaging with the customer. Faced with a need for escalation, the support technician may safely park the multimodal conversation with the customer in orbit 100. The technician may escalate the communication by parking the call to a certain range of extensions, which the call park server may announce to a corresponding group of users. Alternatively, the technician may email the link or send it by text message to other parties. In the current example, the call park server may announce all conversations parked in orbit 100 to an assigned group of escalation support technicians by sending a link encoded with a token uniquely identifying the parked conversation to the escalation technicians. The link may be a URI. The multimodal client applications may display the received URI as a clickable link in the client UI. One of the escalation technicians may click the displayed link to retrieve the parked call. The park server may transfer the parked conversation to the client of the requesting escalation technician if it is still parked at orbit 100. Upon connection, the multimodal conversation client of the escalation technician may establish voice conversation along with instant messaging with the customer while also displaying the messages from the prior IM session. If another escalation technician attempts to retrieve the same parked conversation after previous retrieval, the park server 356 may return an error message which may be displayed in a user friendly format on the client UI.

Figure 4:
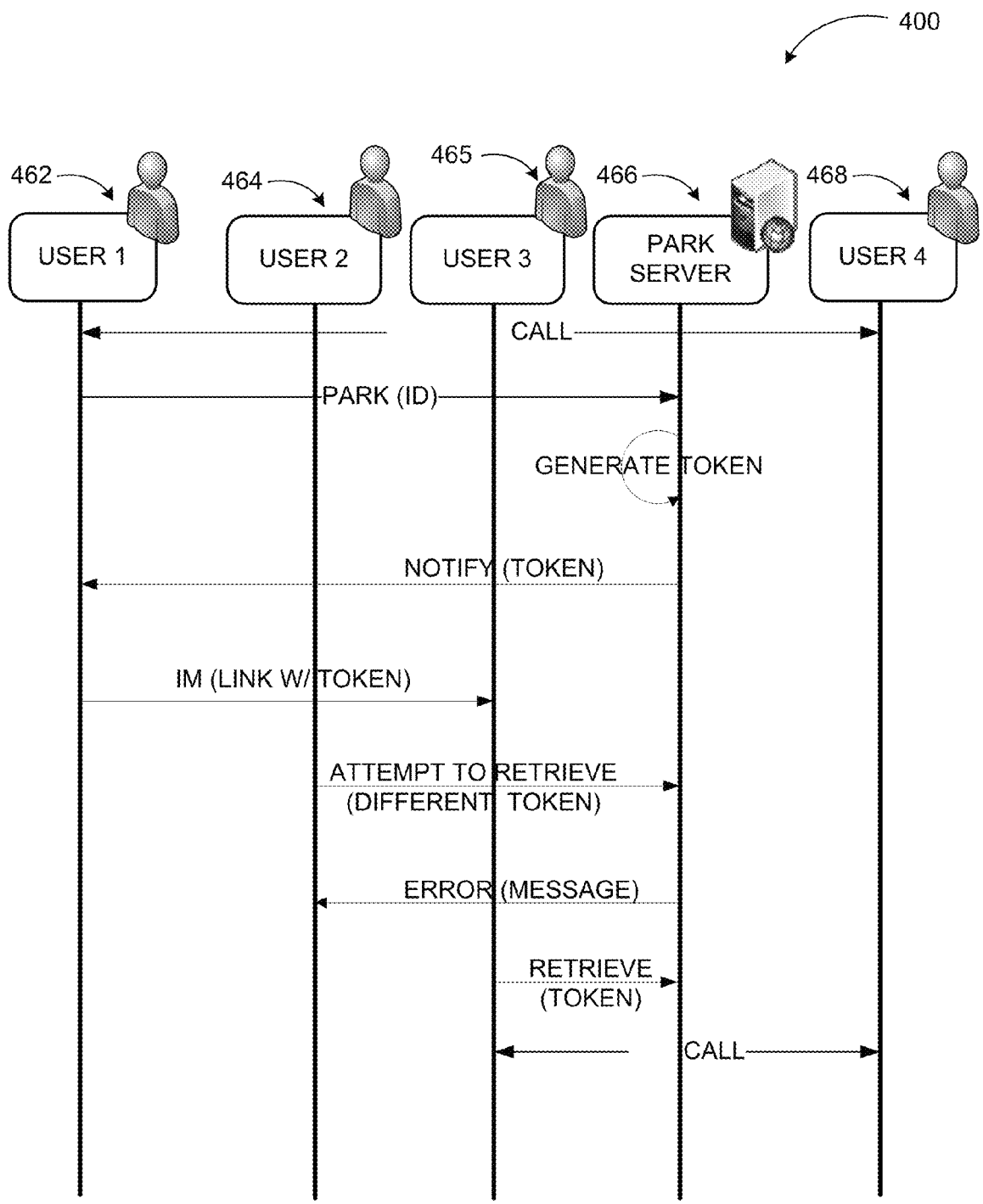
FIG. 4 is an action diagram illustrating example actions in safe parking and retrieval of multimodal conversations in an example two-mode conversation in a unified communication system.

FIG. 4 is an action diagram illustrating example actions in safe parking and retrieval of multimodal conversations in an example two-mode conversation in a unified communication system. User 1 (462), while in an audio call with user 4 (468), may request to park the audio conversation in the park server 466. The park server 466 may generate a token assembled using the call ID. The token may include a combination of information derived from the call ID such as user 4's first name and last name along with the orbit identifier, which may be an extension number associated with the orbit where the audio conversation is parked. Upon generation of the token, the park server 466 may provide the token to user 1, whose client application may synthesize the token into a link associated with the orbit, where the call is parked.

User 1 may then send the link in a text message to user 3 (465). Before user 3 retrieves the audio call from the park server 466 by providing the correct token (selecting the link in the text message) and continues the conversation with user 4, user 2 (464) may attempt to retrieve the call from the same orbit with a different token (e.g. for a previously parked call). Upon confirming that the token does not match the token generated for the particular call, park server 466 may reject the retrieval attempt and provide user 2 with an error message such as "The call to be retrieved is no longer parked at that orbit" even if the orbit is not empty.

Thus, tokens associated with parked calls may be sent by the park server to various clients or the parking client. The parking client may forward the token (by synthesizing it into a link) to further clients. Any recipient of the token may retrieve the call by presenting the token to the park server. However, tokens are not required according to other embodiments. Upon parking a conversation, the call park server may generate a security code such as a personal identification number (PIN) associated with the parked call's parking slot, which a client application may display to the user parking the call. The identifier and parking slot (call park orbit) may then be communicated to one or more users. When a party attempts to retrieve the call, they may be challenged for the PIN and receive an error message if they provide an incorrect PIN. The token may be part of a link or by prompting a user to enter it via DTMF (for example, to secure parked calls that may be retrieved via PSTN endpoints dialing into the PBX).

If a token is used, it may comprise two parts. The first part may simply identify the orbit where the call is parked. The second part may be a unique identifier based on any information associated with the call enabling parking of multiple calls at the same orbit. According to further embodiments, the token may be a single part token derived from a combination of the two parts discussed above (e.g. through hashing the two parts).

Parked conversations in a system according to embodiments may be single mode (e.g. audio) or multimodal. Notifications to other users about the parked call may be provided through another mode of communication or simply through a user interface alert message. Additionally, the error message may be user specific. The error message may display additional information based on user privileges. The error message may also return information about the previous successful transfer.

Figure 5:
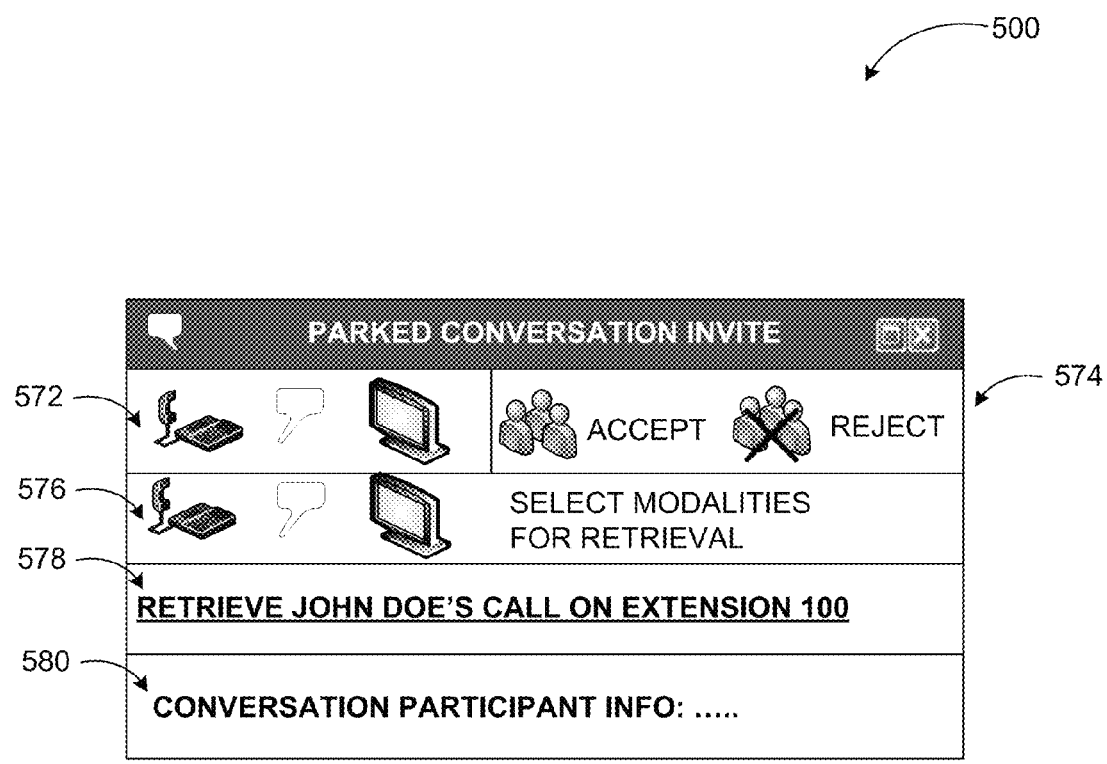
FIG. 5 is an example user interface for a safe parked conversation notification alert in a system according to embodiments.

FIG. 5 is an example user interface for a safely parked conversation notification alert in a system according to embodiments. Parking and retrieval notification in a system according to embodiments may be sent through a variety of means such as an electronic mail message with links to different modalities of the parked conversation, an instant message, a SIP notification, and comparable ones. Another approach may be a notification application that can provide a user interface like user interface 500.

User interface 500 is an example parked conversation invite. It includes graphic representations of current modalities in the parked conversation (572) and graphic/textual options to select acceptance or rejection by the invited user (574). The acceptance may also be accomplished by selecting one or more of the graphic representations of the available communication modes.

UI element 576 displays such selected communication modes for individual selection. Further information may be displayed by the user interface such as the name of the user in the parked conversation, extension number of the orbit holding the parked conversation (578), and conversation participant information 582 (name, address, any other pertinent information).

A user interface for notifying a user about a parked call may include additional or fewer textual and graphical elements, and may employ various graphical, color, and other configuration schemes to display different functionalities. Other notification methods such as those described above may also be employed with additional or fewer elements as discussed herein.

Figure 6:
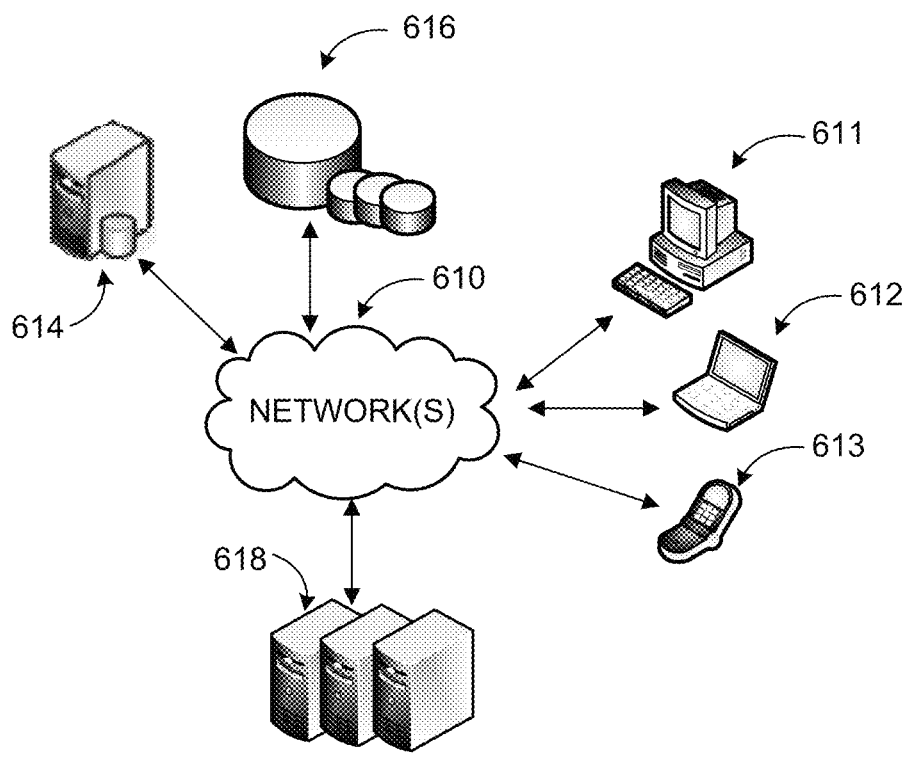
FIG. 6 is a networked environment, where a system according to embodiments may be implemented.

FIG. 6 is an example networked environment, where embodiments may be implemented. An enhanced communication system providing communication services including multimodal conversations with parking and retrieval capability may be implemented via software executed over one or more servers 618 such as a hosted service. The system may facilitate communications between client applications on individual computing devices such as a smart phone 613, a laptop computer 612, and desktop computer 611 (client devices') through network(s) 610.

As discussed above, modern communication technologies such as UC services enable users to utilize a wide range of computing device and application capabilities in conjunction with communication services. This means, a subscriber may use one or more devices (e.g. a regular phone, a smart phone, a computer, a smart automobile console, etc.) to facilitate communications. Depending on the capabilities of each device and applications available on each device, additional services and communication modes may be enabled.

Client devices 611-613 are used to facilitate communications through a variety of modes between subscribers of the communication system. One or more of the servers 618 may be used to park (and subsequently retrieve) one or more of the modalities of an established conversation. Information associated with users and facilitating multimodal conversations may be stored in one or more data stores (e.g. data store 616), which may be managed by any one of the servers 618 or by database server 614.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, data sources, and data distribution systems may be employed to implement a communication system with safe conversation parking and retrieval. Furthermore, the networked environments discussed in FIG. 6 are for illustration purposes only. Embodiments are not limited to the example applications, modules, or processes.

Figure 7:
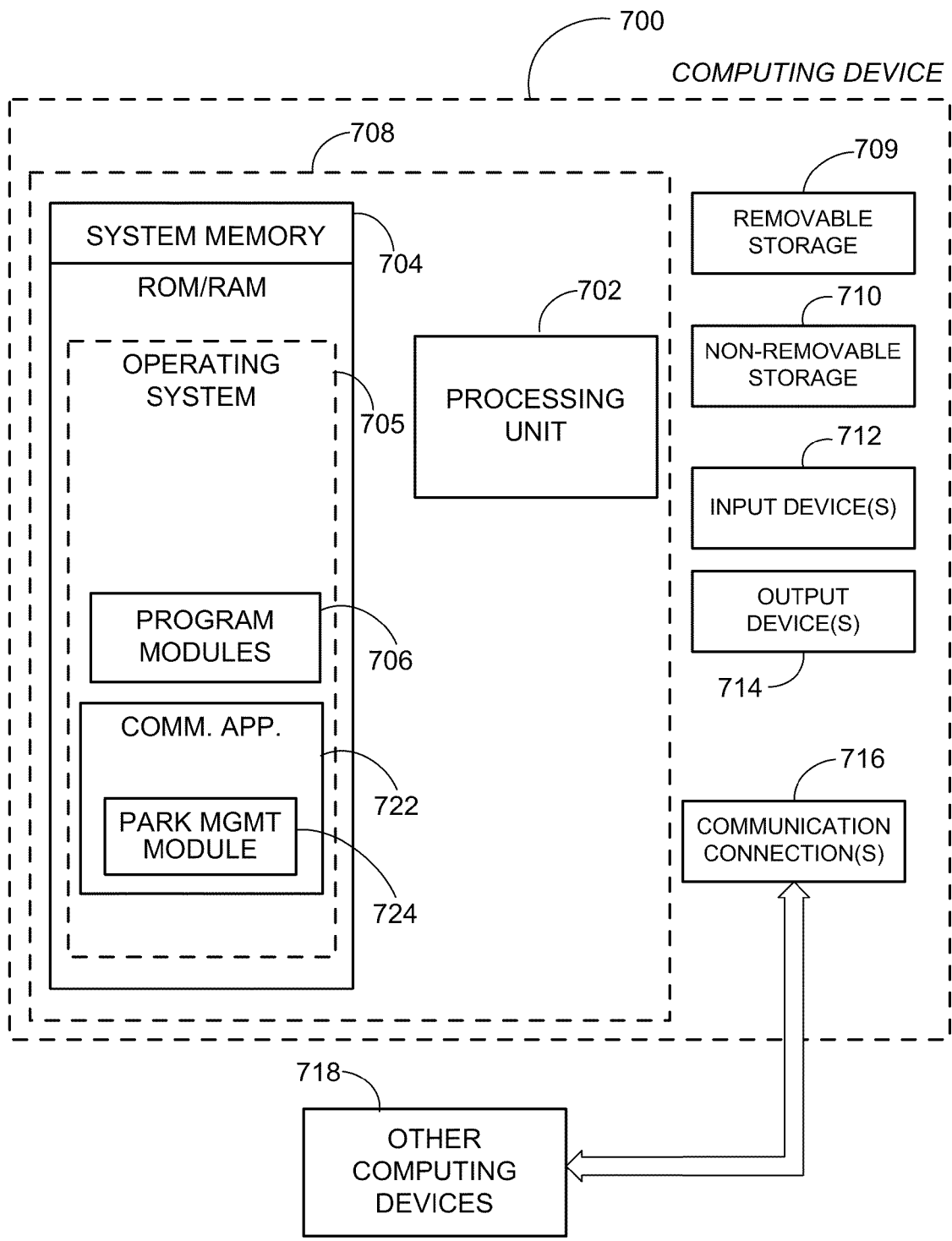
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computing device 700. In a basic configuration, computing device 700 may be a conversation park server as part of an enhanced communication system and include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS® operating systems from MICROSOFT CORPORATION of Redmond, Wash. The system memory 704 may also include one or more software applications such as program modules 706, communication application 722, and park management module 724.

Communication application 722 may be part of a service that facilitates communication through various modalities between client applications, servers, and other devices. Park management module 724 may enable client applications to park some or all of the modalities of established conversations, notify other client applications about the parked conversation, and enable other users to retrieve one or more modalities of the parked conversation. As discussed previously, park management module may coordinate the notification with other applications such as an electronic mail application, an instant message application, and similar ones. This basic configuration is illustrated in FIG. 7 by those components within dashed line 708.

Computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer readable storage media may be part of computing device 700. Computing device 700 may also have input device(s) 712 such as keyboard, mouse, pen, voice input device, touch input device, and comparable input devices. Output device(s) 714 such as a display, speakers, printer, and other types of output devices may also be included. These devices are well known in the art and need not be discussed at length here.

Computing device 700 may also contain communication connections 716 that allow the device to communicate with other devices 718, such as over a wireless network in a distributed computing environment, a satellite link, a cellular link, and comparable mechanisms. Other devices 718 may include computer device(s) that execute communication applications, other directory or policy servers, and comparable devices. Communication connection(s) 716 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 8:
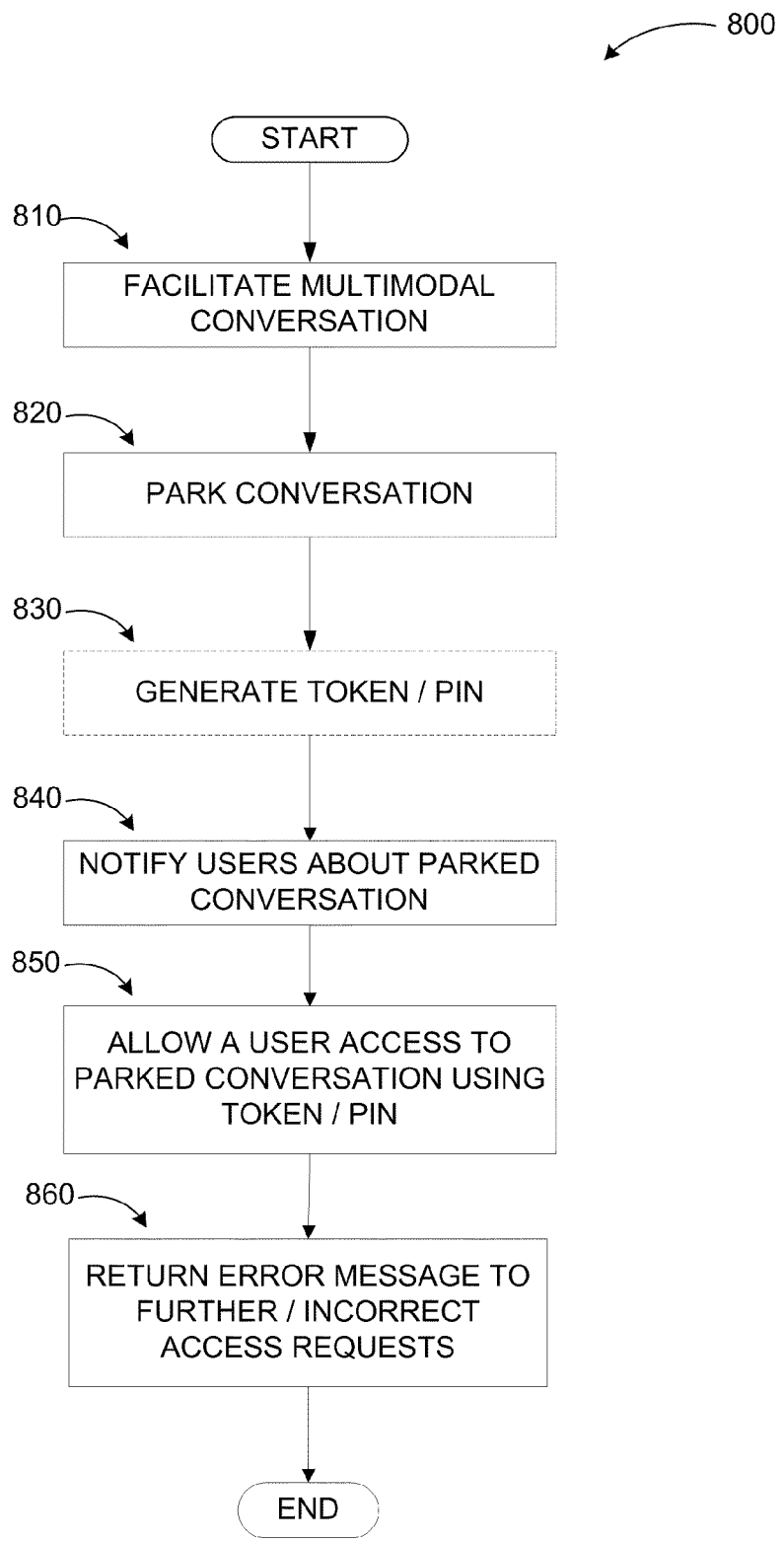
FIG. 8 illustrates a logic flow diagram for safe parking and retrieval of multimodal conversations in an enhanced communication system according to embodiments.

FIG. 8 illustrates a logic flow diagram of process 800 for safe parking and retrieval of multimodal conversations in an enhanced communication system according to embodiments.

Process 800 may be implemented as part of an enhanced communication system that facilitates multiple communication modes.

Process 800 begins with operation 810, where a multimodal conversation is facilitated. As discussed previously, the multimodal conversation may include a number of modalities such as voice, video, electronic mail, instant messaging, application sharing, data sharing, whiteboard sharing, and so on. The conversation may include two or more participants and be initiated by any one of the participants.

At operation 820, one of the participants may park the conversation such that another party can be enabled to join the conversation. Different modalities of the conversation may be parked together or individually (or in groups) at dedicated servers, multi-purpose servers, or even endpoints of the enhanced communication system. The modalities may be identified as belonging together by the conversation identifier (which may be a numeric value, an alphanumeric value, or other symbol).

When the conversation is parked, the park server may generate a token and/or a security code (e.g. a PIN) at operation 830. Such a token may contain a combination of the call identifier and orbit identifier. The orbit identifier may be an extension number belonging to the orbit. The call identifier may be the first name and the last name of the user in the parked call or similar information. The security code may be used to challenge users attempting to retrieve the call for safe retrieval of the call.

At operation 840, the park server may notify one or more users about the parked conversation by sending the generated token. The park server may send the notification to the original parking user or to other user(s). The token may be forwarded by a receiving user to another one through a link encoded with the token.

At operation 850, the park server may allow a user access to the parked conversation presenting the token and/or the security code. The park server may verify the token/security code submitted by the user against the call identifier information and the orbit identifier information. An error message may be returned at operation 850 to any further users who request access to the parked call after the call is retrieved or if their token does not match the generated token.

The operations included in process 800 are for illustration purposes. A communication service with safe call parking and retrieval capability may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for facilitating safe parking and retrieval of a multimodal conversation, the method comprising:
   receiving a request to park the multimodal conversation at a communication server;
   parking the multimodal conversation at the communication server;
   generating a token associated with the multimodal conversation;
   providing the token to one of: a user requesting the parking of the conversation and another user;
   receiving a request to retrieve the parked conversation, wherein the request includes the token;
   returning an error message to the request for retrieval of the parked conversation if the parked call is associated with a security code and the request fails to provide the correct security code; and
   including information about a previous successful transfer in the error message.

2. The method of claim 1, wherein the token uniquely identifies the parked conversation such that a plurality of conversations can be parked at a same orbit over time.

3. The method of claim 1, wherein the token comprises two parts, the first part being an orbit identifier.

4. The method of claim 3, wherein the second part is derived from information associated with the parked conversation.

5. The method of claim 4, wherein the second part is based on a name of a participant of the parked conversation.

6. The method of claim 4, wherein the second part is based on a Uniform Resource Identifier (URI) associated with a participant of the parked conversation.

7. The method of claim 3, wherein the orbit identifier is an extension number.

8. The method of claim 1, further comprising:
   enabling a client application of a user receiving the token to synthesize a link based on the token and forward the link to a further user for retrieval of the parked conversation.

9. The method of claim 1, further comprising:
   providing the token through one of: an electronic mail message, an instant message, a Session Initiation Protocol (SIP) notification, a communication application user interface, and a voice-based alert.

10. The method of claim 1, wherein the conversation includes at least one from a set of: audio communication, video communication, an application sharing session, a data sharing session, a whiteboard sharing session, an electronic mail exchange, and an instant message session.

11. The method of claim 10, further comprising:
    enabling a user presenting the correct token to continue at least one of the modes of the multimodal conversation.

12. A communication system for implementing safe parking and retrieval of a multimodal conversation, the system comprising:
    a communication server configured to facilitate multimodal communications between a plurality of clients of the system;
    a park management server configured to:
       receive a request for parking an established multimodal conversation;
       park the conversation in one of: a centralized manner at the park management server and a distributed manner at a plurality of servers, wherein a plurality of distinct modalities of the conversation are associated together through a generated token representing the multimodal conversation;
       generate a security code associated with the parked conversation;
       confirm the parked conversation to a requesting user by providing the token and the security code to the requesting user and a second user;
       enable retrieval of the parked conversation upon receiving a retrieval request that includes the generated token and the security code;
       display a name of the requesting user in the parked conversation, a dialable orbit extension holding the parked conversation, and information about the second user including at least one of: a name and an address through a user interface; and return an error message to a request for retrieval of the parked conversation without the correct token and the correct security code.

13. The system of claim 12, wherein the token is one of: an escaped and an encoded parked-call header of a Session Initiation Protocol (SIP) message.

14. The system of claim 12, wherein at least one portion of the token includes the dialable orbit extension associated with the parked conversation.

15. The system of claim 12, wherein security code includes a Personal Identification Number (PIN).

16. The system of claim 12, wherein the retrieval request is a new conversation request with the generated token.

17. A method executed in a computing device for managing safe parking and retrieval of calls, the method comprising:

receiving a request to park an established voice call;

parking the voice call at an orbit with a dialable extension identifier;

generating a unique token associated with the parked call, wherein the token is derived from the orbit identifier and information associated with the parked call;

providing the token to one of: a first user requesting the parking of the call and a second user;

enabling retrieval of the call by the first user upon providing the generated unique token in a new conversation request;

displaying a name of the first user in the parked conversation, the orbit with the dialable extension identifier holding the parked conversation, and information about the second user including at least one of: a name and an address through a user interface;

returning an error message to a further request for the retrieval of the parked call; and including information about a previous successful transfer in the error message.

18. The method of claim 17, further comprising:

enabling the first user receiving the token to forward the token to a third user through text-based communication; and enabling the third user to retrieve the parked call through a SIP request.

19. The method of claim 17, wherein the token is generated by hashing the orbit identifier with a unique alphanumeric string associated with the parked call.

20. The method of claim 17, wherein the error message includes information based on user privileges.

* * * * *